M. PRIOR.
COTTON GIN.
APPLICATION FILED JAN. 6, 1909.
1,011,488.
Patented Dec. 12, 1911.
2 SHEETS—SHEET 1.
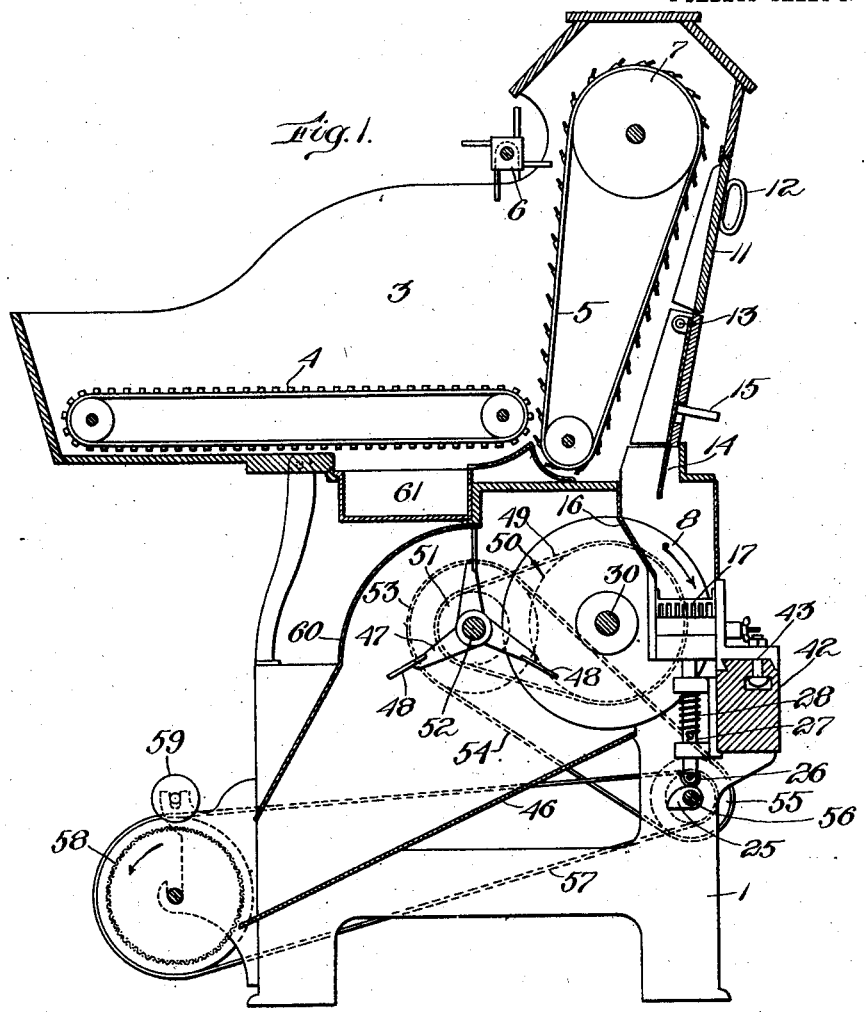
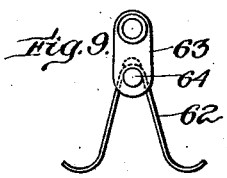
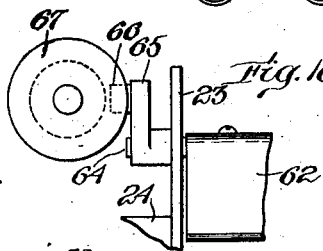
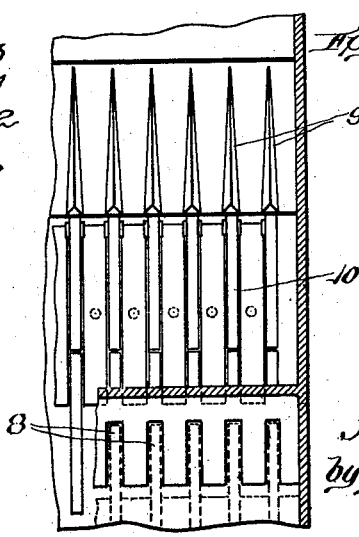
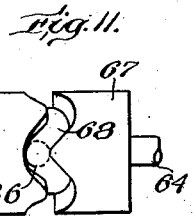
Witnesses:
Edward Maxwell
Wm. J. Pike
Inventor:
Matthew Prior,
by Geo. H. Maxwell
Atty.
COLUMBIA PLANOGRAPH CO., WASHINGTON, D. C.

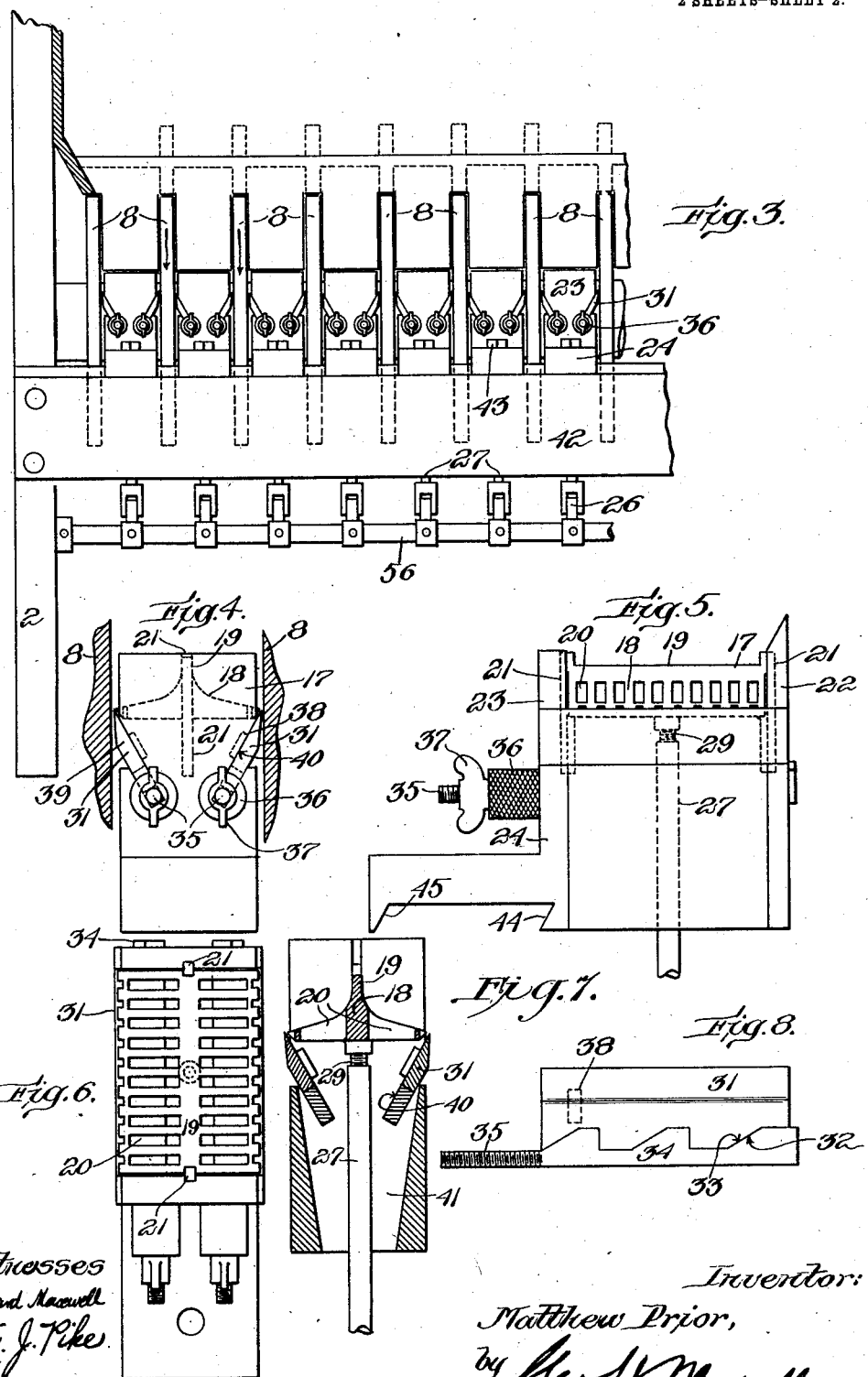

UNITED STATES PATENT OFFICE.

MATTHEW PRIOR, OF WATERTOWN, MASSACHUSETTS, ASSIGNOR TO UNITED COTTON GIN COMPANY, OF BOSTON, MASSACHUSETTS, A CORPORATION OF ARIZONA TERRITORY.

COTTON-GIN.

1,011,488.    Specification of Letters Patent.    Patented Dec. 12, 1911.

Application filed January 6, 1909. Serial No. 470,917.

*To all whom it may concern:*

Be it known that I, MATTHEW PRIOR, a citizen of the United States, residing at Watertown, in the county of Middlesex and State of Massachusetts, have invented an Improvement in Cotton-Gins, of which the following description, in connection with the accompanying drawings, is a specification, like letters on the drawings representing like parts.

My invention is a cotton gin, being an improvement on the general type of so-called roller gin contained in the patent of P. F. King, No. 819,893, patented May 8, 1906, in which the "roller" is shown as made up of a series of disks set parallel on the same shaft.

My invention aims to insure the more rapid, even and thorough stripping of the cotton from the seed, and the elimination as far as possible of the necessity of frequent sharpening and cleaning of the knives or doctors, together with certain improvements relating to the adjustment of the parts and general construction of the machine.

In the drawings, in which I have shown preferred embodiments of my invention, Figure 1 is a vertical transverse sectional view of the complete gin; Fig. 2 is a sectional view showing the feed dividers or cotton distributers in rear elevation; Fig. 3 is a fragmentary view, partly in section, of the ginning portion of the gin; Figs. 4–7 show respectively in front elevation, side elevation, top plan, and cross-section, the vibrator and knives, and Fig. 8, a detail in side elevation of the adjusting mechanism for the knives; and Figs. 9, 10 and 11 are details in end elevation, fragmentary side elevation and front elevation, respectively, of a modified form of vibrator.

The frame of the machine and feeding mechanism may be of any approved kind, being herein shown as consisting of opposite uprights or frame ends 1, 2, having a hopper 3 at the upper end, the cotton being thrown on a slat apron or carrier 4, whence it is delivered to an upright spiked apron 5 past a spiked doffer 6 which doffs off the surplus cotton so that a substantially uniform amount is carried by the apron 5 over the driving drum 7 and thence down to the ginning mechanism.

The parts thus far mentioned are old, and I now come to the features that are new. Inasmuch as my invention is applied to a disk roller form of gin, the disk being indicated at 8, I provide means for insuring that each disk shall receive its proper portions of the seed cotton from the feeding mechanism, and to this end I provide deflectors, herein shown as composed of two parts, the upper part 9 being preferably made of sheet iron and having a substantially knife edge pointed at the upper end and thickening toward the lower end to correspond with the lower part 10, as best shown in Figs. 1 and 2. These deflectors are in line with the disks 8, being spaced apart so as to provide between them chutes or channels for delivering the seed cotton between said respective disks 8. The object is to prevent overloading any one disk or pair of disks with cotton, which is liable to injure or break the machine, and in any event is almost sure to injure the cotton and produce uneven and improper ginning, whereas by my invention the ginning is rendered more uniform. The parts 9 are mounted on a removable section or door 11 provided with handles 12 so as to permit the operator to observe the feeding and have access to the interior of the machine from the front side. Pivoted at 13 in each chute is a gate or stop 14 operated by a push pin or handle 15 for closing any particular chute in case the ginning mechanism for that chute should be out of order or for any other reason it should be desired to stop off the cotton from a portion of the chutes. A tongue or guide 16 directs the cotton from the chutes onto an agitator 17, shown in further detail in Figs. 4–8. In its preferred form the agitator consists of an A-shaped member 18, shown in cross-section in Fig. 7, having a central rib 19 and a series of openings 20 on each side to constitute a seed grid for the escape of the seed after the cotton has been stripped therefrom. This agitator is provided with vertical end ribs 21, Figs. 5 and 6, occupying correspondingly shaped and located grooves in the end supports 22, 23, of a carrier frame 24.

The deflector is rapidly raised and lowered by a cam 25 operating against a roll 26 at the lower end of a supporting rod 27 raised in opposition to a spring 28, said rod being adjustably secured at 29 to the member 18. One of these agitators is provided between each pair of disks so that the seed cotton is kept constantly agitated against each side of each disk and on account of the V-shaped or inclined surfaces of the member 18 of the agitator the cotton is continually thrown with more or less force against the rapidly rotating disks. The disks are driven by their power shaft 30 in the direction of the arrow, Figs. 1 and 3. Coöperating with the sides of the disks are doctor knives 31 which operate in well-known manner, to strip the cotton from the seed, in conjunction with the agitators and disks. These doctors or knives 31 approach close to the disks at their upper acute edges, being set obliquely to said disks as best shown in Figs. 3, 4 and 7. The respective knives are made independently adjustable so as to secure perfectly uniform ginning effect irrespective of the different wear or other special conditions of the respective disks, being for this purpose provided with wedge-shaped inclines 32 on their under sides, coöperating with similarly shaped inclines 33 along the top edge of a bar 34, threaded at its outer end 35, where it is provided with a knurled nut 36 and a set nut 37. The knife 31 is prevented from moving longitudinally by a lug 38 which engages against the end 23 of the carrier frame, so that by moving the bar 34 outwardly lengthwise the knife 31 is adjusted upwardly. The knife 31 has its surface 39 which is next to the ginning disk, slightly divergent therefrom, so that, taken in connection with the oblique angle at which the knives are set in slots 40 provided therefor in the ends 22, 23, it compels the knife to wear sharp and clean without any bur or roughness as it comes in contact more or less with the rough cotton-grabbing surface of the disk 8. The seeds fall through a seed chute or opening 41 in the lower part of the frame 24. The agitator and knives and their carrier frame 24 may be secured to the gin in any suitable manner, being herein shown as secured to a cross beam 42 by bolts 43, inclined surfaces 44, 45, see Fig. 5, being provided for coöperating with said bolts in tightening the frames conveniently and immovably in their adjustment, this securing feature not being my invention however and hence not herein claimed.

As the cotton is thrown against the disks by the agitators the rough surfaces of the sides of the disks grab the fibers of the cotton, pulling the same downwardly over the edges of the knives 31, which act to strip off the fiber from the seed (being sometimes called seed strippers), the cotton being carried on down past the knives by the disks, whence it drops and is doffed onto an inclined cotton chute or trunk 46 by a doffer 47 whose wings 48 wipe rapidly over the sides of the disk, being rotated in an opposite direction by a belt 49 driven by a pulley 50 on the drive shaft 30 and driving a pulley 51 on the doffer shaft 52. Also on said doffer shaft is a pulley 53 which drives a belt 54 engaging in its other end a pulley 55 on the shaft 56, to which are fastened the series of cams 25 which throw the agitators. The shaft 56 serves also to drive a belt 57, which rotates a usual cotton-delivery screen 58 coöperating with a condenser roll 59 to deliver the cotton in a usual bat. A sheet iron hood 60 protects the fan or doffer 47 and keeps in the dust. A usual drawer 61 is provided to catch hulls, leaves, etc.

By my invention the cotton is not only evenly subdivided into a substantially uniform series of streams or feeding portions by the deflectors 9, 10, so that each disk surface gets its proper complement of cotton, but the cotton is kept agitated by the vibrators or agitators 17 so that it cannot choke or wedge unduly beween the knives and disks but is pulled gently and yet rapidly away from the disks just sufficiently to cause the latter to keep a constant thin film or sheet of cotton moving down over each knife until each cotton seed has been stripped thoroughly, whereupon the stripped seeds fall down through the holes or slits 20 and openings 41 to any suitable receptacle. The vibrator also serves to prevent loss of cotton down the seed chute,—quite an important function of this feature of my invention. The wedge-shape or A-construction of the agitator serves to divide the seed cotton, throwing the opposite portions thereof into coöperation with the adjacent surfaces of the respective disks. Instead of securing this agitating movement by a truly vertical up-and-down motion, it may be secured in various other mechanisms, one of which is shown in Figs. 9–11, where it will be seen that a substantially A-shaped piece of metal or other suitable sheet material 62 is secured at 63 to a rock shaft 64 adapted to be mounted in the frame 24 and provided at its outer end, see Fig. 10, with an arm 65 and cam roll 66 engaged by a cam 67 whose path 68, see Fig. 11, serves to give a rocking or swinging movement to the A-shaped member 62, thereby throwing the cotton first against one disk and then against the opposite disk by the swinging vibrating movement of this form of agitator.

It will be understood, as already intimated, that I do not limit myself to the constructional details herein shown, inasmuch as my invention in many respects is broadly new, and accordingly I do not intend to limit myself otherwise than as expressed in the appended claims. Also while I have described my invention, and primarily intend it to be used, for ginning cotton, it will be understood that it is applicable to other analogous uses, such as burring wool and similar uses. By providing a supporting frame 24 for carrying the stripper knives and agitator, it will readily be understood that substantially the entire ginning head may readily be removed as a whole.

Having described my invention, what I claim as new and desire to secure by Letters Patent is:—

1. In a machine of the kind described, the combination with a movable ginning surface and means to move it, of reciprocating agitating mechanism constructed and arranged relative to said ginning surface to rapidly throw loose masses of the fiber directly against normally exposed portions of said ginning surface.

2. In a machine of the kind described, the combination with a movable ginning surface and means to move it, of agitating mechanism arranged to rapidly throw loose masses of the fiber directly against exposed portions of said ginning surface and pull the cotton over said surface intermittingly in an opposite direction to that of the movement of said surface, and means to give said agitating mechanism a short vibration back and forth over said surface.

3. In a machine of the kind described, the combination with a movable ginning surface and means to move it, of agitating mechanism constructed and arranged to intermittently throw loose masses of the fiber directly against exposed portions of said ginning surface and arranged to pull the cotton over said surface in a direction opposite to that of the movement of said surface.

4. In a machine of the kind described, a movable ginning surface, means for feeding fiber thereto to be ginned, a ginning knife a seed grid for preventing the escape of fiber while permitting the escape of seeds or foreign substance, and means for rapidly agitating said seed grid over the said movable ginning surface ahead of the knife to aid the ginning surface in stripping the fiber.

5. In a machine of the kind described, a movable ginning surface including a pair of disks having their adjacent sides provided with fiber-grabbing ginning surfaces, means for delivering fiber into the space between said ginning surfaces to be ginned thereby, and a rapidly moving agitator approximately closing said space for preventing the improper escape of fiber and compelling the latter to engage said ginning surfaces.

6. In a machine of the kind described, a movable ginning surface including a pair of disks having their adjacent sides provided with fiber-grabbing ginning surfaces, means for delivering fiber into the space between said ginning surfaces to be ginned thereby, and a rapidly moving agitator located between said disks and having an approximately A-shape for throwing the fiber against said ginning surfaces.

7. In a machine of the kind described, a movable ginning surface including a pair of disks having their adjacent sides provided with fiber-grabbing ginning surfaces, means for delivering fiber into the space between said ginning surfaces to be ginned thereby, a rapidly moving agitator located between said disks having an approximately A-shape and provided with openings for the escape of seeds or the like.

8. In a machine of the kind described, a movable ginning surface including a pair of disks having their adjacent sides provided with fiber-grabbing ginning surfaces, means for delivering fiber into the space between said ginning surfaces to be ginned thereby, and a vertically reciprocating agitator located between said disks for constantly fluffing up the fiber against said ginning surfaces.

9. In a machine of the kind described, a movable ginning surface including a pair of disks having their adjacent sides provided with fiber-grabbing ginning surfaces, means for delivering fiber into the space between said ginning surfaces to be ginned thereby, a frame located between said disks having opposite end portions approximately spanning the distance between said ginning surfaces, an agitator having end guides arranged to move vertically in ways provided therefor in said end portions for throwing the fibers against said ginning surfaces, and means for rapidly raising and lowering said agitator as the disks rotate.

10. In a machine of the kind described, a movable ginning surface including a pair of disks having their adjacent sides provided with fiber-grabbing ginning surfaces, means for delivering fiber into the space between said ginning surfaces to be ginned thereby, a frame located between said disks having opposite end portions approximately spanning the distance between said ginning surfaces, a grid-like agitator having end guides arranged to move vertically in ways provided therefor in said end portions for throwing the fibers against said ginning surfaces, and means for rapidly raising and lowering said agitator as the disks rotate.

11. In a machine of the kind described, a movable ginning surface including a pair of disks having their adjacent sides provided with fiber-grabbing ginning surfaces, means for delivering fiber into the space between said ginning surfaces to be ginned thereby, a frame located between said disks having opposite end portions approximately spanning the distance between said ginning surfaces, a grid-like, A-shaped agitator having end guides arranged to move vertically in ways provided therefor in said end portions for throwing the fibers against said ginning surfaces, and means for rapidly raising and lowering said agitator as the disks rotate.

12. In a machine of the kind described, a transverse series of rotary disks having side ginning surfaces, means for delivering fiber thereto to be ginned, a vertically movable agitator adjacent the side of each disk, a transverse shaft provided with cams located below said agitators, and connections between said agitators and cams for reciprocating the former by the latter.

13. In a machine of the kind described, a transverse series of rotary disks having side ginning surfaces, means for delivering fiber thereto to be ginned, a vertically movable agitator adjacent the side of each disk, a transverse shaft provided with cams located below said agitators, and adjustable connections between said agitators and cams for reciprocating the former by the latter.

14. In a machine of the kind described, a transverse series of rotary disks having side ginning surfaces, means for delivering fiber thereto to be ginned, a vertically movable agitator adjacent the side of each disk, a transverse shaft provided with cams located below said agitators, said agitators having depending supporting rods for engaging said cams, and springs tending to move said rods in opposition to said cams.

15. In a machine of the kind described, a transverse series of rotary disks having side ginning surfaces, and means for delivering fiber thereto to be ginned, including means for delivering a mass of fiber as such above said series of disks, and a series of deflectors above said series of disks for sub-dividing said mass above the disks into substantially separate portions for the respective disks before it reaches proximity to the latter, said deflectors coöperating to form individual chutes for delivering said separated portions of fiber in separate columns above the disks to the respective disks.

16. In a machine of the kind described, a transverse series of rotary disks having side ginning surfaces, and means for delivering fiber thereto to be ginned, including means for delivering a mass of fiber, a series of deflectors for sub-dividing said mass into substantially separate portions for the respective disks, said deflectors coöperating to form individual chutes for delivering said separate portions of fiber to the respective disks, and means for stopping the feeding of fiber in a portion of said chutes.

17. In a machine of the kind described, a transverse series of rotary disks having side ginning surfaces, and means for delivering fiber thereto to be ginned, including means for delivering a mass of fiber, a series of deflectors for sub-dividing said mass into substantially separate portions for the respective disks, said deflectors coöperating to form individual chutes for delivering said separate portions of fiber to the respective disks, and externally operable means for stopping the feeding of fiber in a portion of said chutes without stopping the machine.

18. In a machine of the kind described, a transverse series of rotary disks having side ginning surfaces, and means for delivering fiber thereto to be ginned, including means for delivering a mass of fiber, a series of deflectors for sub-dividing said mass into substantially separate portions for the respective disks, said deflectors coöperating to form individual chutes for delivering said separate portions of fiber to the respective disks, and a cut-off gate mounted in each chute for temporarily stopping the feeding of fiber in any individual chute as desired.

19. In a machine of the kind described, a transverse series of rotary disks having side ginning surfaces, and means for delivering fiber thereto to be ginned, including means for delivering a mass of fiber, and a series of deflectors for sub-dividing said mass into substantially separate portions for the respective disks before it reaches the region of the disks, said deflectors coöperating to form individual chutes for delivering said separate portions of fiber to the respective disks, the upper portions of said deflectors having a vertical knife edge for aiding in said sub-dividing of the fiber.

20. In a machine of the kind described, a transverse series of rotary disks having side ginning surfaces, and means for delivering fiber thereto to be ginned, including means for delivering a mass of fiber, and a series of deflectors for sub-dividing said mass into substantially separate portions for the respective disks before it reaches the region of the disks, said deflectors coöperating to form individual chutes for delivering said separate portions of fiber to the respective disks, the upper portions of said deflectors having a vertical knife edge and being shallow at their upper extremities and gradually going deeper toward their lower ends for aiding in said sub-dividing of the fiber.

21. In a machine of the kind described, a transverse series of rotary disks having side ginning surfaces, and means for delivering fiber thereto to be ginned, including means for delivering a mass of fiber, and a series of deflectors for subdividing said mass into substantially separate portions for the respective disks, said deflectors coöperating to form individual chutes for delivering said separate portions of fiber to the respective disks, the upper portions of said chutes and deflectors being externally movable from operative position for purposes of inspection.

22. In a machine of the kind described, a pair of coaxially mounted rotary disks with their adjacent lateral sides transverse to their axes constituting ginning surfaces, a stripper knife mounted adjacent each of said side ginning surfaces, and means for independently adjusting said knives with relation to said ginning surfaces.

23. In a machine of the kind described, a pair of coaxially mounted rotary disks with their adjacent lateral sides transverse to their axes constituting ginning surfaces, a stripper knife mounted adjacent each of said side ginning surfaces, and a separate adjusting device for each knife to adjust it toward and from its ginning surface.

24. In a machine of the kind described, a rotary disk having a lateral side ginning surface transverse to its axis, a stripper knife set obliquely to said ginning surface, and means for adjusting said knife obliquely toward and from said surface.

25. In a machine of the kind described, a rotary disk having a side ginning surface, a stripper knife set obliquely to said ginning surface, and a longitudinally movable adjusting bar for engaging said knife, one of said parts having a wedge surface and the other having a portion engaging said wedge surface whereby longitudinal movement of said bar operates to move the knife toward said ginning surface.

26. In a machine of the kind described, a rotary disk having a side ginning surface, a stripper knife set obliquely to said ginning surface, said knife being provided with depending wedge surfaces, a bar provided with coöperating complemental wedge surfaces, and means for longitudinally moving said bar, whereby the wedge surfaces of the bar are caused to move longitudinally on the wedge surfaces of the knife thereby raising said knife with relation to said ginning surface.

27. In a machine of the kind described, a rotary disk having a side ginning surface, a stripper knife set obliquely to said ginning surface, and a longitudinally movable adjusting bar for engaging said knife, one of said parts having a wedge surface and the other having a portion engaging said wedge surface whereby longitudinal movement of said bar operates to move the knife toward said ginning surface, said bar having a threaded outer end, and an adjusting nut mounted thereon for effecting said longitudinal movement.

28. In a machine of the kind described, a rotary disk having a side ginning surface, a stripper knife set adjacent said ginning surface, end supports for said knife having ways extending obliquely with relation to said ginning surface in which the knife is mounted, and means for adjusting said knife in said ways so as to maintain its active face parallel to said ginning surface.

29. In a machine of the kind described, a rotary disk having a side ginning surface, a stripper knife set adjacent said ginning surface, end supports for said knife having ways extending obliquely with relation to said ginning surface in which the knife is mounted, said knife having on its under side depending wedge portions, and a bar mounted adjacent its ends in said ways provided with complemental wedge surfaces to coöperate with the wedge surfaces of the knife, and means for moving said bar longitudinally and thereby moving said knife transversely in said ways.

30. In a machine of the kind described, a pair of rotary ginning disks with their adjacent sides constituting ginning surfaces, a knife-supporting frame having end portions set transversely of said disks between said ginning surfaces, said end portions being separated to receive the fiber between them for delivery to said ginning surfaces, and opposite stripper knives, one for each of said ginning surfaces, said knives being set at their ends in said end portions of the frame divergently from each other and standing at similarly oblique angles with relation to their respective ginning surfaces.

31. In a machine of the kind described, a pair of rotary ginning disks with their adjacent sides constituting ginning surfaces, a knife-supporting frame having end portions set transversely of said disks between said ginning surfaces, said end portions being separated to receive the fiber between them for delivery to said ginning surfaces, opposite stripper knives, one for each of said ginning surfaces, said knives being set at their ends in said end portions of the frame divergently from each other and standing at similarly oblique angles with relation to their respective ginning surfaces, and means for adjusting said knives toward and from said ginning surfaces.

32. In a machine of the kind described, a pair of rotary ginning disks with their adjacent sides constituting ginning surfaces, a knife-supporting frame having end portions set transversely of said disks between said ginning surfaces, said end portions being separated to receive the fiber between them for delivery to said ginning surfaces, opposite stripper knives, one for each of said ginning surfaces, said knives being set at their ends in said end portions of the frame divergently from each other and standing at similarly oblique angles with relation to their respective ginning surfaces, and means for independently adjusting said knives toward and from their respective ginning surfaces.

33. In a machine of the kind described, a pair of rotary ginning disks with their adjacent sides constituting ginning surfaces, a knife-supporting frame having end portions set transversely of said disks between said ginning surfaces, said end portions being separated to receive the fiber between them for delivery to said ginning surfaces, and opposite stripper knives, one for each of said ginning surfaces, said knives being set at their ends in said end portions of the frame divergently from each other and standing at similarly oblique angles with relation to their respective ginning surfaces, said frame having side portions below said knives separated from each other to constitute a seed chute.

34. In a machine of the kind described, a pair of rotary ginning disks having side ginning surfaces, and a ginning head removably mounted between said disks and comprising opposite stripper knives, a rapidly moving agitator coöperating with said two knives, and a supporting head for supporting said knives and agitator, said supporting head, agitator, and knives being removable together as a whole from between said pair of disks and replaceable as a whole between the disks.

35. In a machine of the kind described, a pair of rotary ginning disks having side ginning surfaces, and a ginning head mounted for removal as a whole between said disks and comprising opposite stripper knives, a rapidly reciprocating agitator coöperating with said two knives, means for adjusting said knives toward and from their respective ginning surfaces, and a supporting head for supporting said knives and agitator.

36. In a machine of the kind described, a pair of rotary ginning disks having side ginning surfaces, and a ginning head removably mounted between said disks and comprising opposite stripper knives, a rapidly moving agitator coöperating with said two knives, means for independently adjusting said knives toward and from their respective ginning surfaces, and a supporting head for supporting said knives and agitator all removable as a whole ginning head from between said disks.

37. In a machine of the kind described, a pair of rotary ginning disks having side ginning surfaces, and a ginning head removably mounted between said disks and comprising opposite stripper knives, a rapidly moving agitator coöperating with said two knives, means for adjusting said agitator vertically with respect to said knives, and a supporting head for supporting said knives and agitator.

38. In a machine of the kind described, a pair of rotary ginning disks having side ginning surfaces, and a ginning head removably mounted between said disks and comprising opposite stripper knives, a rapidly moving agitator coöperating with said two knives, said agitator having a central raised rib and opposite surfaces downwardly sloping therefrom toward said respective knives, means for relatively adjusting said knives and agitator with relation to each other, and a supporting head for supporting said knives and agitator.

39. In a machine of the kind described, a pair of rotary ginning disks having side ginning surfaces, and a ginning head removably mounted between said disks and comprising opposite stripper knives, a rapidly moving agitator coöperating with said two knives, said agitator having transverse slots for the passage of seeds and matter ginned from the fiber, said knives converging downwardly toward each other for deflecting said ginned matter away from said ginning surfaces, and a supporting head for supporting said knives and agitator.

40. The combination with a pair of spaced-apart movable plane faces formed as ginning surfaces and means to move them, of agitating mechanism disposed therebetween for simultaneously throwing the fiber against the ginning surfaces and arranged to pull the cotton intermittently in a direction opposite to that of the movement of said surfaces.

41. A gin, comprising a movable plane ginning surface, means for feeding fiber thereto to be ginned, a ginning knife, a seed grid for preventing the escape of fiber while permitting the escape of seeds or foreign substance, and means for rapidly agitating said seed grid over the said plane ginning surface ahead of the knife to aid the ginning surface in stripping the fiber.

In testimony whereof, I have signed my name to this specification, in the presence of two subscribing witnesses.

MATTHEW PRIOR.

Witnesses:
M. J. SPALDING,
EDWARD MAXWELL.

---

Copies of this patent may be obtained for five cents each, by addressing the "Commissioner of Patents, Washington, D. C."